No. 644,393. Patented Feb. 27, 1900.
C. B. ALBREE.
PIPE JOINT.
(Application filed Apr. 29, 1899.)
(No Model.)
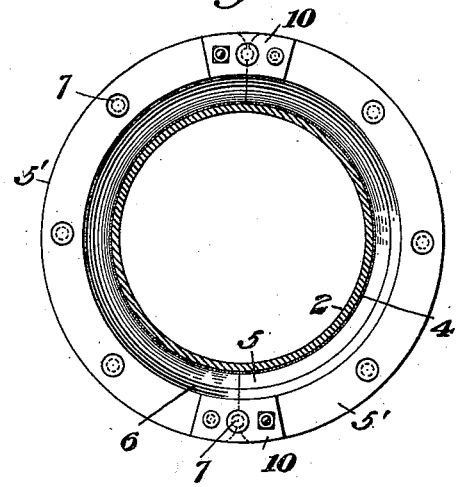
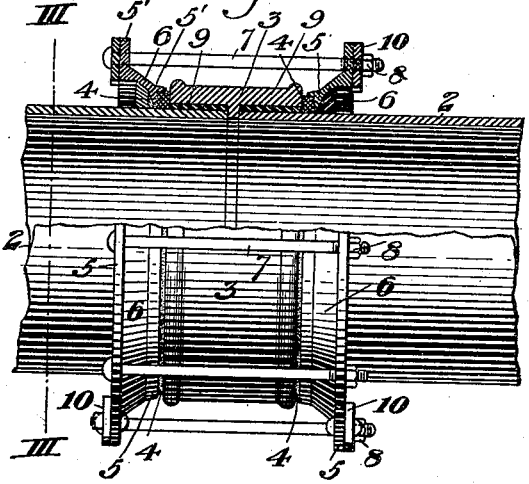
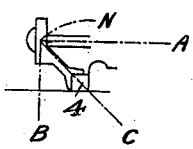
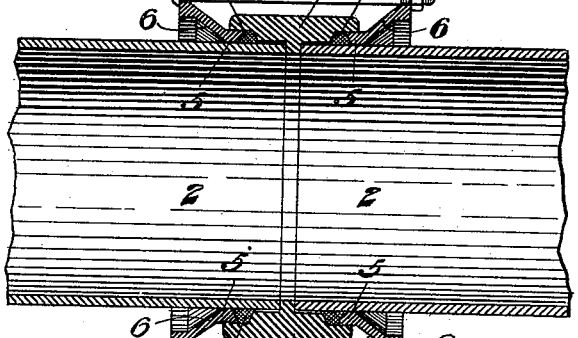
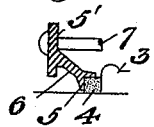
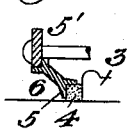
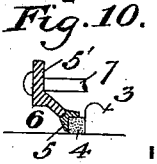
WITNESSES
Thomas W. Bakewell
G. A. Wright
INVENTOR
Christo B Albree

UNITED STATES PATENT OFFICE.

CHESTER B. ALBREE, OF ALLEGHENY, PENNSYLVANIA.

PIPE-JOINT.

SPECIFICATION forming part of Letters Patent No. 644,393, dated February 27, 1900.

Application filed April 29, 1899. Serial No. 714,974. (No model.)

*To all whom it may concern:*

Be it known that I, CHESTER B. ALBREE, of Allegheny, in the county of Allegheny and State of Pennsylvania, have invented a new and useful Improvement in Pipe-Joints, of which the following is a full, clear, and exact description, reference being had to the accompanying drawings, forming part of this specification, in which—

Figure 1 is a vertical axial section of a permanent pipe-coupling constructed in accordance with my invention. Fig. 2 is a like view of my improved coupling applied to the repair of an old joint. Fig. 3 is a vertical cross-section on the line III III of Fig. 2. Fig. 4 is a diagram view, and Figs. 5 to 10 are sectional views of modified constructions of web.

The object of my invention is to provide a coupling for sealing the joints of pipes for the conduction of gas, air, or other fluids, the advantages of my improved device being especially its ease of application and the security with which it seals the joints. I have found it of great value in making tight the joints of gas-pipes, for devices of the kind used heretofore have given trouble and have occasioned great loss because of their liability to loosen and leak under the conditions to which they are exposed in use; but my invention will also be found to be of value for the joints of oil and water pipes.

Referring first to the construction illustrated in Fig. 1, 2 2 represent the ends of pipes the joint between which it is desired to seal permanently. 3 represents an ordinary sleeve, within which the pipe ends are inserted, and 4 4 are gaskets or packings of rubber or other suitable material placed in recesses at the ends of the sleeve. To compress the gaskets, I employ outwardly-inclined webs 6, adapted at their inner edges 5 to bear against the gaskets and having at their outer margins flanges 5', through which the webs are connected by bolts 7 and nuts 8. When these nuts are tightened, so as to draw the webs toward each other, the webs rotate in the direction N around the gaskets 4, as shown in the diagram view, Fig. 4. In that diagram the line A represents the pull of the bolts, B represents the resistance which the web 6 exerts against being stretched and enlarged in diameter by the rotative force applied to it by the tension of the bolts, and the line C represents the resistance of the web to compression. The resultant of the pull in the line A and the resistance of the ring B is a thrust in the direction C, exerted on the gasket by the web, which acts as a strut, holding the gasket in place and compressing it with great firmness against the joint which is to be sealed.

In the modification of my invention shown in Fig. 2, which is adapted for the repair of leaking joints on existing couplings, 9 9 are the usual lead rings between the sleeve and the pipe. The gaskets 4 4 are set at the ends of the lead rings and the sleeve, and the ends of the rings 5 5 are shaped to fit the gaskets 4 4 and need not touch the pipe. The annular web is made in halves, which are secured together on the pipes by plates 10 and bolts and rivets. The construction is otherwise the same as in Fig. 1, but is more especially adapted for the purpose of repair, while the construction shown in Fig. 1 is better adapted for making permanent joints.

Within the scope of my invention as stated in the claims many changes may be made in the construction and arrangement of the parts of my improved device, for the precise shape of the web and flange is immaterial so long as they have the general characteristics defined in the claims.

In Figs. 5 to 10 I show modifications of the web and have denoted the parts by like reference-numerals to those in Fig. 1. In Fig. 9 the web and flange are made in separate parts, and in Fig. 10 the web and its inner marginal bearing-surface 5 are in separate parts.

I claim—

1. As a packing device for a pipe-joint, a web arranged to extend rearwardly and obliquely from the joint at an angle to the pipe, and bear at its inner portion against packing, and means for drawing the outer portion of the web toward the middle of the joint; substantially as described.

2. As a packing device for a pipe-joint, webs arranged to extend outwardly and rearwardly from the joint and from each other at oblique angles to the pipe, and bear at their inner portions against packings, and means for drawing the outer portions of the webs toward each other; substantially as described.

3. As a packing device for a pipe-joint, a web arranged to extend rearwardly and obliquely from the joint at an angle to the pipe, and bear at its inner portion against a packing, a flange at the outer margin of the web, and bolts connected with the flange and adapted to draw the web toward the middle of the joint; substantially as described.

In testimony whereof I have hereunto set my hand.

CHESTER B. ALBREE.

Witnesses:
 THOMAS W. BAKEWELL,
 S. VICTOR KING.